United States Patent
Lai

(10) Patent No.: US 9,248,513 B2
(45) Date of Patent: Feb. 2, 2016

(54) QUICK-CHANGE ATTACHMENT CONFIGURATION FOR A HOLE SAW

(71) Applicant: ROTE MATE INDUSTRY CO., LTD., Taichung (TW)

(72) Inventor: Ying-Tsung Lai, Taichung (TW)

(73) Assignee: Rote Mate Industry Co., LTD., Taichung (TW)

( * ) Notice: Subject to any disclaimer, the term of this patent is extended or adjusted under 35 U.S.C. 154(b) by 267 days.

(21) Appl. No.: 13/916,898

(22) Filed: Jun. 13, 2013

(65) Prior Publication Data

US 2014/0369775 A1 Dec. 18, 2014

(51) Int. Cl.
*B23B 51/04* (2006.01)
*B23B 31/107* (2006.01)

(52) U.S. Cl.
CPC ......... *B23B 51/0473* (2013.01); *B23B 31/1071* (2013.01); *B23B 51/0426* (2013.01); *Y10T 408/895* (2015.01); *Y10T 408/896* (2015.01); *Y10T 408/8973* (2015.01); *Y10T 408/95* (2015.01)

(58) Field of Classification Search
CPC ...................... Y10T 408/895; Y10T 408/8957; Y10T 408/94; Y10T 408/95; Y10T 408/957; Y10T 408/953; B23B 51/0473; B23B 51/0406
USPC ........... 408/204, 206, 238, 239 R, 239 A, 240
See application file for complete search history.

(56) References Cited

U.S. PATENT DOCUMENTS

| | | | |
|---|---|---|---|
| 3,267,975 A * | 8/1966 | Enders | 408/200 |
| 5,226,762 A * | 7/1993 | Ecker | 408/204 |
| 7,934,893 B2 | 5/2011 | Gillissen | |
| 2004/0179911 A1* | 9/2004 | Keightlev | 408/204 |
| 2005/0025592 A1* | 2/2005 | Cantlon | 408/204 |
| 2007/0160435 A1* | 7/2007 | Chao | 408/102 |
| 2008/0260480 A1* | 10/2008 | Keightley | 408/204 |
| 2009/0279972 A1* | 11/2009 | Novak et al. | 408/239 R |
| 2010/0067995 A1* | 3/2010 | Keightley | 408/68 |

* cited by examiner

*Primary Examiner* — Daniel Howell
*Assistant Examiner* — Yasir Diab
(74) *Attorney, Agent, or Firm* — Raymond Y. Chan; David and Raymond Patent Firm

(57) ABSTRACT

A quick-change attachment configuration is directed to a tool for use with a hole saw for boring holes on a wooden plank, particularly the quick-change attachment configuration is arranged for quickly replacing a longitudinal body, which is a drill bit shank having a driving end, a tool end, and a limiting portion. The configuration includes a quick-change attachment for assembling a longitudinal body and a hole saw which has an axial hole for allowing a longitudinal body to move on the quick-change attachment, and a locking component for locking and releasing the longitudinal body on and from the quick-change attachment. The locking component has a first component and a second component, which when used, the longitudinal body is easily moved slidably and locked so the shreddings emerging from the hole saw are cleaned.

20 Claims, 12 Drawing Sheets

QUICK-CHANGE ATTACHMENT CONFIGURATION FOR A HOLE SAW

BACKGROUND OF THE INVENTION

1. Fields of the Invention

The present invention is directed to a quick-change attachment means for a hole saw, which is a tool used with a hole saw specifically used for wooden planks. The quick-change attachment means is particularly designed for coupling to a hole saw, in which the locking component and the positioning component in the quick-change attachment means can allow for faster reload of longitudinal body and detachment from the hole saw.

2. Descriptions of Related Art

As with the technology disclosed in Chinese Patent Application No. CN101076420A, entitled "Quick-change and Plug Eject Arbor for a Hole Saw," the quick-change attachment means used for quickly replacing drill bit shank where the quick-change attachment means can be fitted to the hole saw is coupled to the longitudinal body (which is a drill bit shank), and is locked with respect to the longitudinal body and cannot be free to rotate, and also locked axially. Because of this setup, a plug of the sawn material can be pushed out of the hole saw after a material is sawn by slidably releasing the attachment means from the longitudinal body before passing the longitudinal body through the quick-change attachment means.

The quick-change attachment means can be slidably released from the longitudinal body, and further apply a latch to slidably release the quick-change attachment means from the longitudinal body, before allowing the longitudinal body to further move into the holes. In this way, a slant terminal end of the longitudinal body can be used to push the plug out the hole saw, without needing any tool or disassembly tools.

Disadvantageously, because the latch operates by pressing from top to bottom, and an end of the latch is used as a fulcrum, a problem with the invention is that the user using the tool would have to press down and hold down the latch on another end of the fulcrum. The applied force holding on these positions may not be necessarily well-distributed, and the disproportional pressing may consequently cause the user to exert more strength than necessary in order to suppress the latch down from becoming subject to axial release. As a result the adapter would be required to be threadably coupled first to the threaded hole. A problem implicated by this structure is that the actuating of the hole saw and the longitudinal body are both handled by radial rotation, and the adapter is also subject to radial rotation when coupling, therefore it is highly possible that during operation of the driving mechanism, the anti-vibrational force can cause the threaded spots of the quick-change attachment means and the hole saw to unscrew, thereby jeopardizing the cutting process.

Accordingly, the inventor of the present invention, in an objective to resolve the above-identified shortcomings, has through improvement made in pursuit for innovative approach for problem solving, as well as relentless efforts to strive for technical progress, has for many accounts of trials, experiments with full and comprehensive conception, arrive at the present utility model invention and hereby files for a utility model patent protection.

SUMMARY OF THE INVENTION

With the quick-change attachment means for a hole saw, it is an objective of the present invention to provide a locking switch capable of reducing required applied force and capable of locking and releasing a longitudinal body. Another advantage of the present invention is that it is possible to required less number of mechanical parts for assembly, thereby decreasing construction difficulty which also preserving use safety.

A main feature of the quick-change attachment means of the present invention is that the quick-change attachment means includes a locking component that can allow the longitudinal body to be slidably released and locked, the quick-change attachment means also includes a positioning component that can keep the quick-change attachment means attached in a predetermined place on the hole saw and disconnect therefrom.

The locking component of the longitudinal body according to the present invention has the advantage of being intuitive to use, and can release and allow the longitudinal body to slide freely on the quick-change attachment means. In more elaborate terms, the positioning component uses two pins for serving its positioning purpose. Also, the positioning component is installed in the quick-change attachment means to actuatingly fix the quick-change attachment means onto the closed surface of the hole saw. This is enabled because the working condition for the hole saw requires an assembly together with a longitudinal body, and the quick-change attachment means can provide support for coupling the longitudinal body to the hole saw to facilitate subsequent rotation for actuation.

An objective of the present invention is to offer a method in which the quick-change attachment means, one that can be quickly replaced in the longitudinal body, can be attached and fixed in place on the hole saw, can lock onto the drill bit shank after the longitudinal body passes through the hole of the quick-change attachment means. The longitudinal body can be free to rotate radially while it is axially locked in place. By way of the above mechanism, a longitudinal body can be dislodged from the quick-change attachment means and the hole saw, while shavings emerging from the working terminal of the longitudinal body can be removed at the same time when the longitudinal body is dislodged from the quick-change attachment means and the hole saw. Applicable situations benefiting the above solution include after the hole saw has performed cutting, after the longitudinal body has been unlocked from the quick-change attachment means.

The quick-change attachment configuration for a hole saw is directed to a tool for use in drilling circular holes on wooden planks. Its constitution includes a hole saw, a longitudinal body and a quick-change attachment means, the hole saw herein includes a threaded aperture, a closed end, and coupling apertures. The longitudinal body is a shank that is capable of accommodating a drill bit, it includes a driving end, a tool end and a limiting portion, wherein the limiting portion cooperates with the quick-change attachment means to securely couple the locking component to the shank.

An advantage of the present invention is that the quick-change attachment means used for assembling the longitudinal body and the hole saw together comprises a locking component and a positioning component. The locking component comprises a first component and a second component. The first component has an axial hole, an attachment means, a threaded portion, first attachment apertures and positioning apertures. The component has a first central hole, second attachment holes, and first through holes, where an outer diameter of an end of the first central hole is curvilinear.

The positioning component has a second central hole, receiving holes, mortises and two pins. Each of the receiving holes includes first openings and second openings, wherein the inner diameter of each of the second opening is smaller than the inner diameter of each of the first opening, an end of the mortise is closed and another end of the mortise is open. An end of each of the pins whose outer diameter slightly diminishes is formed into a connecting portion. Regarding the mortises, the hole diameter of each of the mortise fits exactly with an outer diameter of the connecting portion of each of the pins and securely connected thereon. Each of the receiving holes of the positioning component is inserted with an actuating pin, which has an expanding portion on one end and of the actuating pin and a positioning portion on another end of the actuating pin. Further, the actuating pin is equipped with a spring and is inserted into each of the receiving holes at an end of each of the positioning portions, and out of the second openings, before passes through the first through holes of the second component and is securely connected to the positioning apertures of the first component by a tenon and mortise joint. The attachment portion of the first component passes through the first central hole of the second component.

The axial hole is located on the attachment portion of the first component and traverses toward the threaded portion in a radial direction. The attachment portion has locking apertures located on the two ends of its radial axis, wherein each of the locking apertures is inserted with a retaining ball. Another aspect of the advantage of the current invention is that the outer diameter of the attachment means is slightly smaller than the first central hole and the second central hole, and the threaded portion is capable of being threadably connected to the threaded aperture of the hole saw.

Additionally, the pins are designed to pass through the first attachment apertures of the first component and the second attachment apertures of the second component, and are allowed to pass through the second attachment holes before passing through the coupling apertures to prevent the quick-change attachment means from unscrewing off the safety-ensuring positioning configuration of the hole saw.

In another aspect of the invention, the axial hole of the first component can provide the longitudinal body with room for axial movement through the quick-change attachment means. The retaining ball set in the locking aperture of the first component is used for locking the longitudinal body. More specifically, the subject invention involves using the upward and downward displacement of the retaining ball as a means to provide a mechanism dedicated to fasten the longitudinal body, in which the position of the retaining ball is switched between being pressed downward to be retained or released from the limiting portion of the longitudinal body at the command of the forward and backward movement of the second component. An inner diameter of one end of the second central hole of the positioning component includes an expanding receiving portion, which can provide for enveloping a biasing member. By way of operating the second component of the locking component with respect to switching between forward-moving and backward-moving displacement, the retaining ball can operate to be pressed downward to lock the connecting portions of the crank of the longitudinal body, or by the effect of switching to move the second component from its position, the retaining ball can be free from hold-up and detachable from the limiting portion of the longitudinal body, and can be raised upward, so that the shank for holding the drill bit can be detached from the quick-change attachment means and hole saw.

Additionally, the connecting portion and mortise on one end of the pin of the positioning component are designed to be securely connected with a tenon and mortise joint, in such a way that the connecting portion can provide for the quick-change attachment means to prevent the hole saw from unscrewing off due to driving effectuated by rotational movement. This mechanism enables the component to assist the quick-change attachment means to be threadably connected to the threaded aperture, wherein the pins pass through the coupling apertures of the hole saw.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
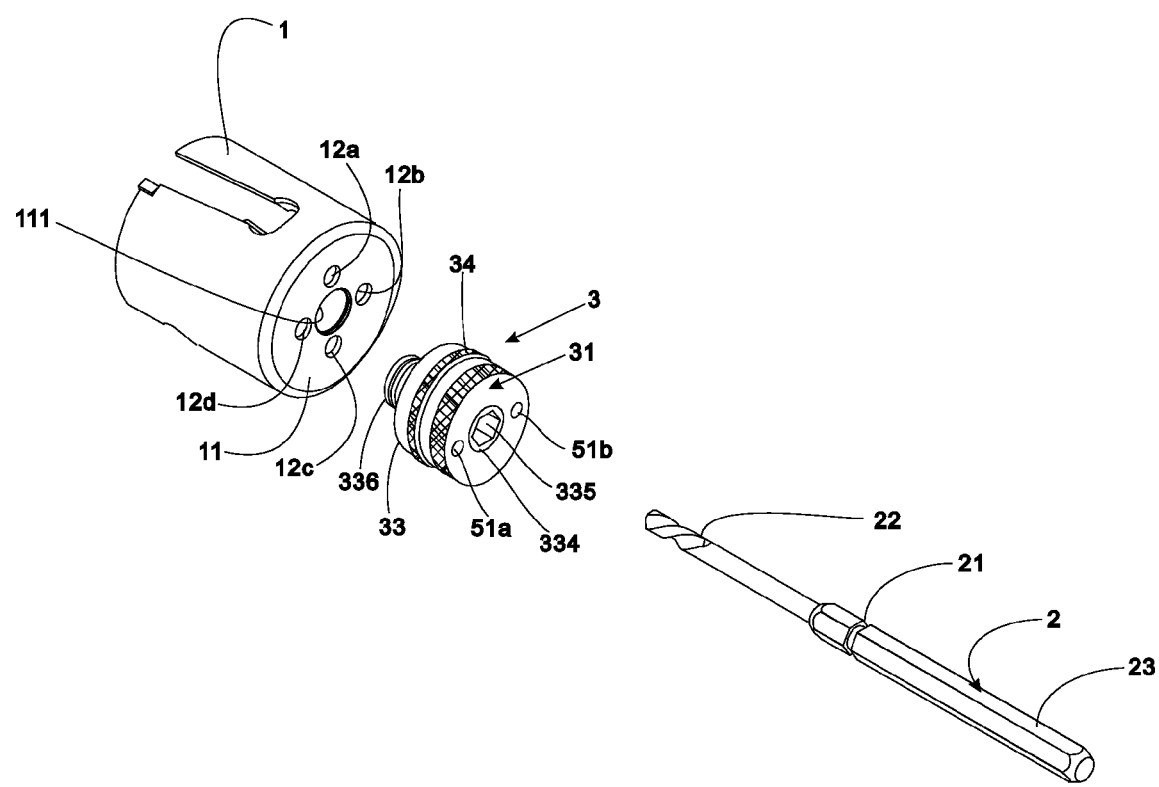
FIG. 1 shows an exploded view of a possible embodiment of the hole saw, quick-change attachment means, and a longitudinal body for the current invention.
Figure 2:
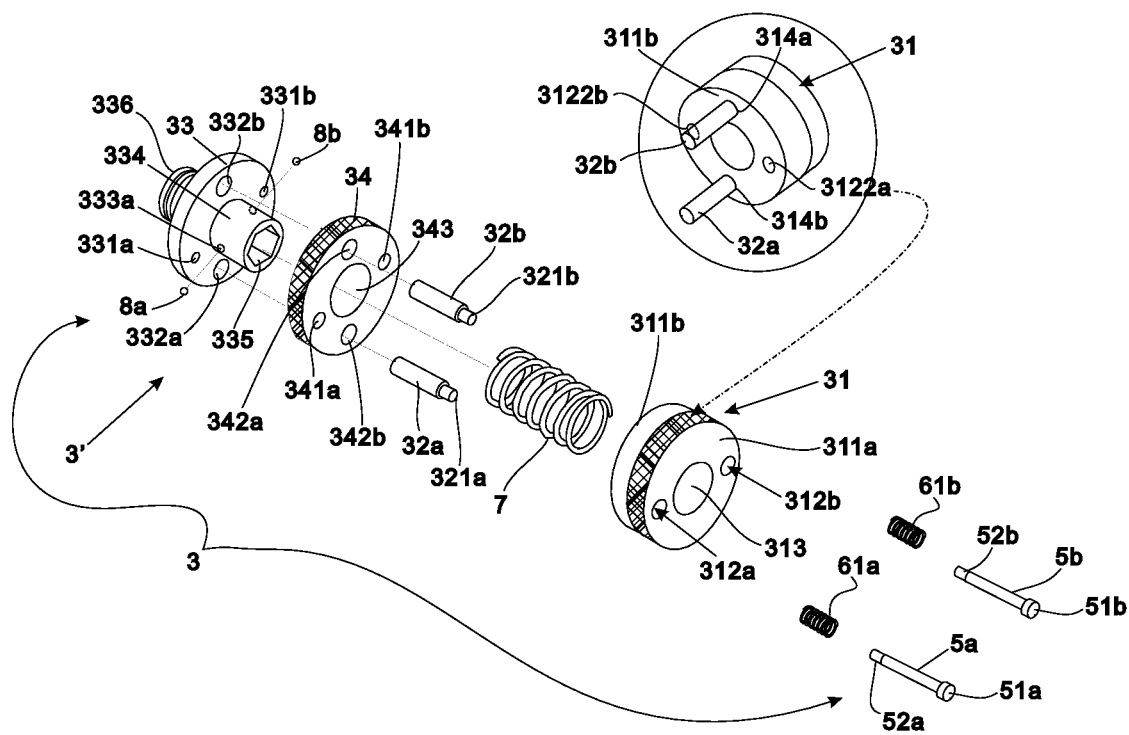
FIG. 2 shows an exploded view of the quick-change attachment means for a first embodiment for the current invention.
Figure 3:
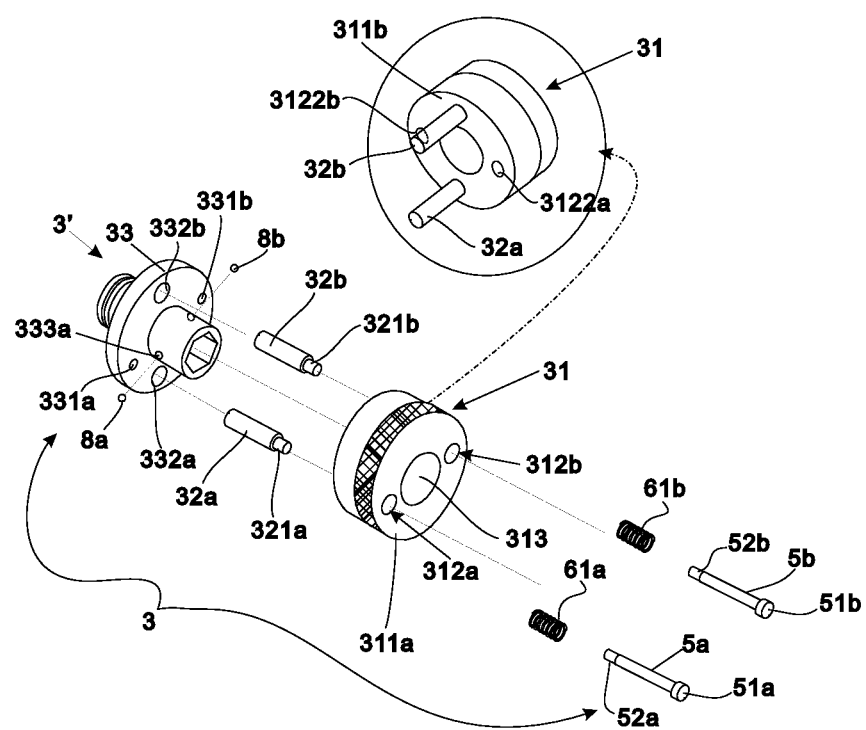
FIG. 3 shows an exploded view of the quick-change attachment means for a second embodiment for the current invention.
Figure 4:
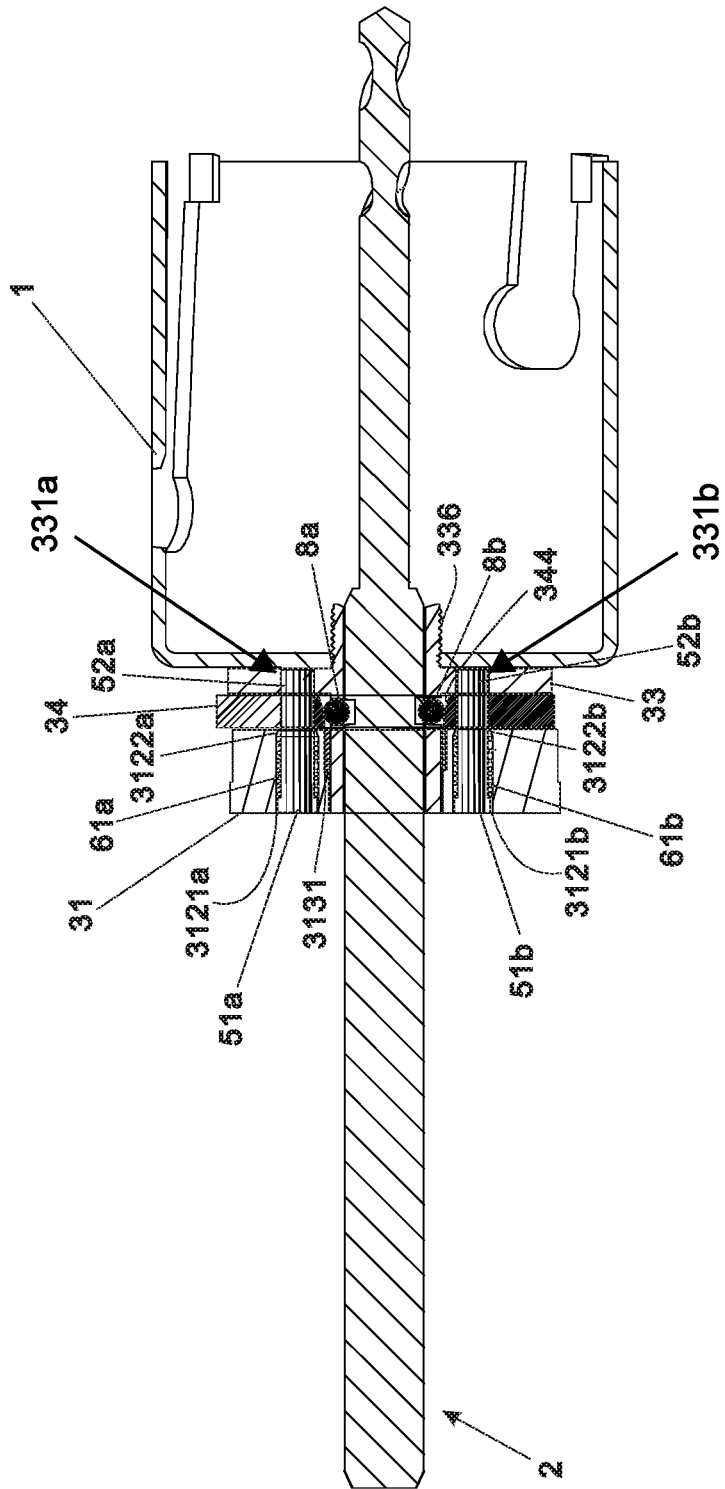
FIG. 4 is a cross-sectional view of the first embodiment for the current invention.

In order to enable a person skilled in the relevant technology to practice the invention described in the specification, the objectives, technical features and effects will be further understood in connection with the Preferred Embodiments and in conjunction with the Drawings below.

Referring now to the first embodiment illustrated in FIGS. 1 through 8, the quick-change attachment configuration for a hole saw includes a hole saw 1, a longitudinal body 2 and a quick-change attachment means 3. The hole saw 1 has a threaded aperture 111, a closed surface 11, and coupling apertures 12a, 12b, 12c, 12d. The coupling apertures 12a, 12b, 12c, 12d are each separated with each pair aligned to form a cross on the closed end 11. The threaded aperture 111 is located at the axial center of the closed end 11; further, the longitudinal body 2 is a drill bit shank, which includes a drilling end 23, a tool end 22, and a limiting portion 21, wherein the limiting portion 21 can be used to help the quick-change attachment means 3 fasten the locking component 3' and ultimately look the movement of the longitudinal body 2.

More particularly, the quick-change attachment means 3 used for assembling the longitudinal body 2 and the hole saw 1 comprises a locking component 3' and a positioning component 31. The locking component 3' comprises a first component 33 and a second component 34. The first component 33 has an axial hole 335, an attachment portion 334, a threaded portion 336, first attachment apertures 332, 332b and positioning apertures 331a, 331b. The second component 34 is a fastening component that is free to move forward and backward axially, which has a first central hole 343, second attachment holes 342a, 342b and first through holes 341a, 341b. A portion of the outer diameter of the first central hole 343 is disposed with a curvilinear position 344.

Note that the positioning component 31 has a first end surface 311a and a second end surface 311b, and a second central hole 313 receiving holes 312a, 312b and mortises 314a, 314b are interposed between the first end surface 311a and the second end surface 311b. Moreover, 314a, 314b are disposed on the second end surface 311b, for providing the connecting portions 321a, 321b of the locking pins 32a, 32b to be riveted to the mortises 314a, 314b. The receiving holes have first openings 3121a, 3121b, and second openings 3122a, 3122b. The inner diameter of each first opening 21211, 3121b traverses axially for a predetermined distance from one end of each second opening 3122a, 3122b. As will be understood by the illustration of FIG. 7, an end of each of the mortises 314a, 314b is an opening, the diameter of an end of each of the locking pins 32a, 32b slightly decreases to form connecting portions 312a, 321b. The diameter of each of the mortises 314a, 314b fits exactly with the diameters of the connecting portions 321a, 321b. By the above, the connecting portions 321a, 321b of the locking pins 32a, 32b are connected to the mortises 314a, 314b by a tenon and mortise joint.

As will be seen, the receiving holes 312a, 312b of the positioning component 31 can receive the actuating pins 5a, 5b. Ends of each of the actuating pins 5a, 5b are expanding portions 51a, 51b, and the other ends of each of the actuating pins are disposed with positioning portions 52a, 52b. After each of the actuating pins 5a, 5b pass through a spring 61a, 61b, the positioning portions 52a, 52b are inserted through the receiving holes 312a, 312b of the first openings 3121a, 3121b, pass through the second openings 3122a, 3122b, before being passed through the first through holes 341a, 341b of the second components, where they are fastened by a tenon and mortise joint to the positioning apertures 331a, 331b. The expanding portions 51a, 51b are anchored on the inclined plane of the inner diameters of the second openings 3122a, 3122b. Meanwhile, the attachment means 334 of the first component 33 pass through the first central hole 343 of the second component, and the second central hole 313 of the positioning component.

The axial hole 335 of the first component 33 is installed in the axial direction of the attachment portion 334 and extends through the threaded portion 336, the axial hole 335 has a hexagonal shape. The two ends on the radial axis of the attachment portion 334 are disposed with locking apertures 333a, 333b. The locking apertures 333a, 333b are receivable for certain retaining balls 8a, 8b. The outer-diameters of the attachment portions are slightly smaller than the outer diameters of the first central hole 3434 and the second central hole 313. Additionally, the attachment portion 334 is jacketed by a biasing member 7 and passes through the second central hole 313 of the positioning component 31 after the attachment portion 334 passes through the first central hole of the second component 34. The jacket attachment portion is also restricted for movement by means of the blocking portion 3131 pre-established in the space defined by the inner diameter of the second central hole 313.

The threaded portion 336 is used to threadably attach and be secured to the threaded aperture 111 of the hole saw 1. The locking pins 32a, 32b pass through the first attachment holes 332a, 332b of the first component 33 and the second attachment holes 342a, 342b of the second component 34. After they are set up to pass through the second attachment holes 342a, 342b, they can be asserted into any pair of the coupling apertures 12a, 12b, 12c, 12d of the hole saw 1 in order to prevent the quick-change attachment means from unscrewing off from the hole saw 1 due to the radial rotation as effected by the hole saw 1.

Figure 5:
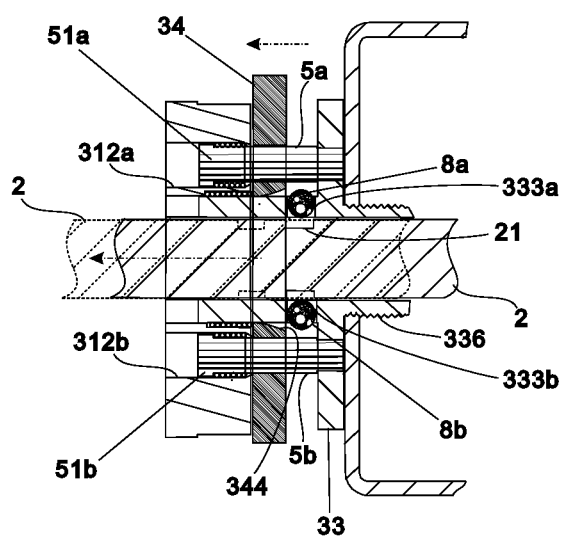
FIG. 5 is a cross-sectional view of the quick-change attachment means and the longitudinal body in a quick-change mode according to the first embodiment of the current invention.
Figure 6:
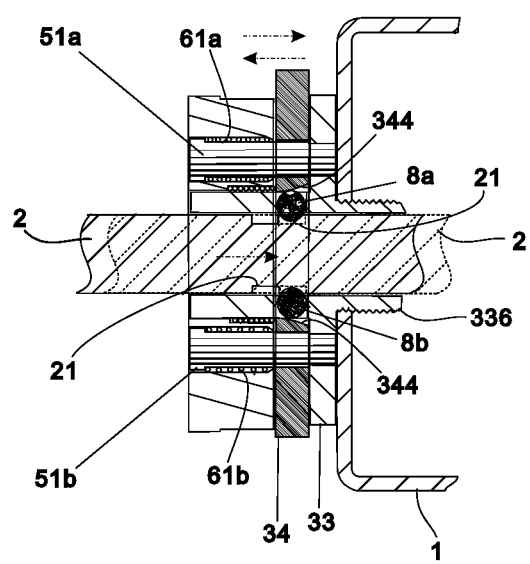
FIG. 6 is a cross-sectional view of the quick-change attachment means and the longitudinal body in a locked mode according to the first embodiment of the current invention.

Next, the locking and quick disassembly of the longitudinal body 2 and the quick-attachment means 3 are depicted in FIGS. 5 and 6. The longitudinal body 2 can move radially in the axial hole 335 of the first component 3 of the quick-change attachment means 3. The components for locking the longitudinal body 2 are the set in the retaining balls disposed in the locking apertures 333a, 333b. By way of displacing the second component 34 backward in a radial direction, the longitudinal body 2 can pass through the axial hole 335 until the limiting portion 21 reach the locking apertures 333a, 333b. At this point, the second component 34 is released to allow the springs 61a, 61b housing the actuating pins 5a, 5b to return the second component 34 back to its original position, and at the same time the curvilinear portion 344 is used to push against the retaining balls 8a, 8b, which are pressed downward from the locking apertures 333a, 333b onto the limiting portion 21 of the longitudinal body 2. By way of the force applied as resulting from the springs compressed by the actuating pins 5a, 5b, the second component 34 is held to be closely attached to the first component. This leads the bottom end of the curvilinear portion 344 of the second component 34 to be tightly pressed to the retaining balls 8a, 8b. In this situation there are some areas of the retaining balls 8a, 8b that protrude out of the bottom ends the locking apertures 333a, 333b and can be held up on the limiting portion of the longitudinal body 21. This means that the longitudinal body can be securely locked on the quick-change attachment means 3.

According to an embodiment of the invention, a method for disassembling the longitudinal body 2 from the quick-change attachment means 3 are the following. One is to start by displacing the second component 34 backward in order to disattach the second component embedded into the retaining balls 8a, 8b of the limiting portion 21 of the longitudinal body 2 from the compression of the second component 34. By this approach, the retaining balls 8a, 8b would, in an opposite fashion, be pushed out of the limiting portion 21 by the surface of the outer axial handle of the limiting portion 21 of the longitudinal body 2, and pushed upward to finally return to the locking apertures. In this configuration, some areas of the retaining balls 8a, 8b protrude out of the bottom ends of the locking apertures 333a, 333b, thereby forcing the retaining balls 8a, 8b to exit out of the limiting portion 21 in order to allow the longitudinal body 2 to disattach from the quick-change attachment means 3.

The function of the actuating pins 5a, 5b is to assist in returning the second component 34 and the positioning component 31 back to its original position during their axial displacement. Because ends of the springs 61a, 61b are limited by the enlarged portions 51a, 51b after the actuating pins are housed by the springs 61a, 61b, which is meant to prevent the springs from unscrewing off the actuating pins 5a, 5b. Then the actuating pins 5a, 5b that are housed with springs 61a, 61b are inserted into receiving holes 312a, 312b. The positioning component 31 is pushed backward at the same time when the second component 34 used for operating the locking component 3' is switched between a forward and backward movement. In other more elaborated words, the actuating pins 5a, 5b located inside the receiving holes 312a, 312b can recede or return to their original position at the same time. Under the effect created by the enlarged portions 51a, 51b of the actuating pins 5a, 5b being held up in the second openings 3122a, 3122b of the receiving hole 312a, 312b, the actuating pins 5a, 5b will not be completely removed from the receiving holes 312a, 312b. Also, the actuating pins 5a, 5b and the attachment portions 334 are disposed in respective positions relative to the locking apertures 333a, 333b of the attachment portion in a parallel fashion, the upper and lower pitch length of the actuating pins 5a, 5b and the attachment portion 34 are smaller than the outer diameter of the retaining balls 8a, 8b. This arrangement is set up to block the retaining balls 8a, 8b form excessive movement, disabling the retaining balls 8a, 8b from complete detachment from the locking apertures 333a, 333b. This means the retaining balls 8a, 8b can be limited inside the locking apertures 333a, 333b. Notably, the maximum outer diameters of the retaining balls are required to be larger than the inner diameters of the lower ends of the locking apertures 333a, 333b such that the retaining balls would not break away from the lower ends of the locking apertures 333a, 333b.

Figure 7:
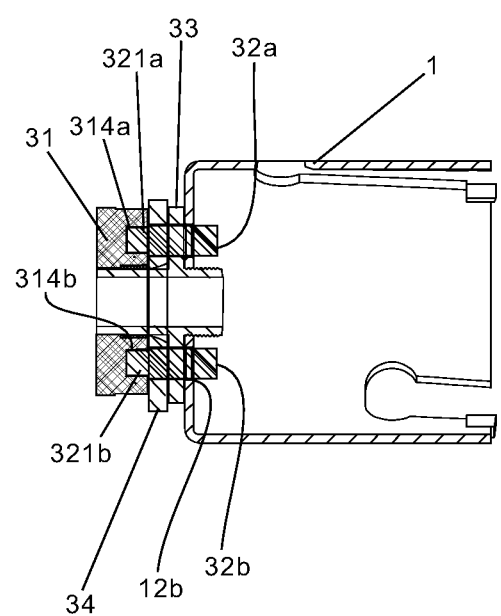
FIG. 7 is a cross-sectional view of the quick-change attachment means and the hole saw in a quick-change mode according to the first embodiment of the current invention.
Figure 8:
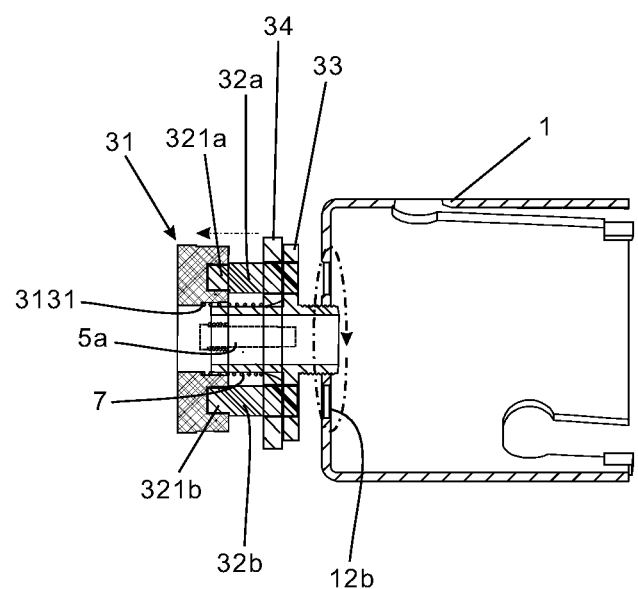
FIG. 8 is a cross-sectional view of the quick-change attachment means and the hole saw in a locked mode according to the first embodiment of the current invention.

Reference is now turned to FIGS. 7 and 8 for the positioning and quick-change operation of the quick-change attachment means 3 and the hole saw 1.

The drawings here show the on and off position for an assembly of a quick-change attachment means 3 and a hole saw 1. In the current embodiment, the positioning component 31 of the quick-change attachment means 3 is pulled backward to be temporarily held in a particular position, causing the locking pins 32a, 32b to simultaneously move backward. At this time the biasing member 7 disposed between the positioning component 31 and the second component 34 can be set to push against the second component 34, so as to prevent the second component 34 and the positioning component 31 from moving backward. Next, the threaded portion 336 is threadably coupled to the threaded aperture 111 of the hole saw 1 until the locking pins 32a, 32b of the quick-change attachment means 3 are aligned with the coupling apertures 12a, 12b, 12c, 12d of the closed end 11 of the hole saw 1. After the locking pins 32a, 32b are aligned with the two apertures corresponding to the coupling apertures 12a, 12b, 12c, 12d, the positioning component 31 is released in order for itself to return to its original position. At this point, by way of the locking pins 32a, 32b returning to their positions, the locking pins 32a, 32b protrude and pass through the corresponding two apertures of the coupling apertures 12a, 12b, 12c, 12d so that the hole saw 1 can be prevented from unscrewing after the quick-change attachment means 3 is set to pass through the coupling apertures 12a, 12b, 12c, 12d of the hole saw 1.

Next, a walkthrough of how to operate quick-change mechanism with the quick-change attachment means 3 and the hole saw 1 will be discussed. The positioning component 31 of the quick-change attachment means 3 is pulled backward and held down in a locked position by hand, and the locking pins 32a, 32b are permitted to move backward such that after the locking pins 32a, 32b are detached from the two apertures corresponding to the coupling apertures 12a, 12b, 12c, 12d, the threaded portion 336 is rotated to be unscrewed from the threaded aperture 111 of the hole saw 1, before the held-down positioning component 31 is released in order to return to its original position, meanwhile, the corresponding locking pins 32a, 32b can return to their original position, the quick-change attachment means 3 is uncoupled from the hole saw 1.

Next, as shown in FIGS. 9 through 12 which depict the second embodiment of the present invention, the quick-change attachment means 3 includes a locking component 3' and a positioning component 31, wherein the locking component 3' is the first component 33, the first component 33 has an axial hole 335, an attachment portion 334, a threaded portion 336, a first attachment holes 332a, 332b and positioning apertures 331a, 331b. The positioning component 31 has a second central hole 313, receiving holes 312a, 312b, mortises 314a, 314b, and two locking pins 32a, 32b. The receiving holes 312a, 312b have first openings 3121a, 3121b and second openings 3122a, 3122b. The inner diameters of the second openings 3122a, 3122b are smaller than the inner diameter of the first openings 3121a, 3121b. The width of diameters of the first openings 3121a, 3121b spans from a distance away from ends of the receiving holes 312a, 312b to terminal ends and gradually shrink to form the second openings 3122a, 3122b whose inner diameter define an inclined surface. An end of each of the mortises 314a, 314b is designed to be closed, while another end of them is designed to be open. The diameter of an end of each of the locking pins 32a, 32b gets slightly smaller to become connecting portion 321a, 321b. The aperture diameters of the mortises 314a, 314b fit exactly with the outer diameter of the connecting portions 321a, 321b of the locking pins 32a, 32b. In this way, the connecting portions 321a, 321b of the locking pins 32a, 32b and the mortises 314a, 314b are connected together by way of a tenon and mortise joint. The receiving holes 312a, 312b of the positioning component can be used to house actuating pins 5a, 5b, which have ends that are formed to be enlarged portions 51a, 51b. Other ends have positioning portions 52a, 52b. After the actuating pins 5a, 5b are set to house springs 61a, 61b, the positioning portions 52a, 52b are introduced through the first openings 3121a, 3121b of the receiving holes, before passed through the second openings 3122a, 3122b and secured to the positioning apertures 331a, 331b of the first component 33 by way of a tenon and mortise joint. The enlarged portions 51a, 51b are set to be held against the inclined surface defined by the inner diameter of the second openings 3122a, 3122b. The attachment portion 334 of the first component 33 passes through the second central hole 313 of the positioning component 31. The axial hole 335 of the first component 33 is disposed on the attachment portion 334 in the axial direction and extends toward the threaded portion 336. The hole of the axial hole 335 has a hexagonal shape. The attachment portion 334 has locking apertures 333a, 333b on the two ends in the radial direction. The locking apertures 333a, 333b provide for insertion of retaining balls 8a, 8b. Further, the outer diameter of the attachment portion 334 is slightly smaller than the first central hole 343 and second central hole 313, and the threaded portion 336 is threadably attached to the threaded aperture 111 of the hole saw 1.

Also, after the pins 32a, 32b pass through the first component 33 and the first attachment holes 332a, 332b pass through the second attachment holes 342a, 342b, the locking pins 32a, 32b can be inserted into any set of mutually corresponding apertures of the coupling apertures 12a, 12b, 12c, 12d, such that the quick-change attachment means 3 can be prevented from unscrewing from the hole saw 1 when the hole saw 1 is rotating radially.

Figure 9:
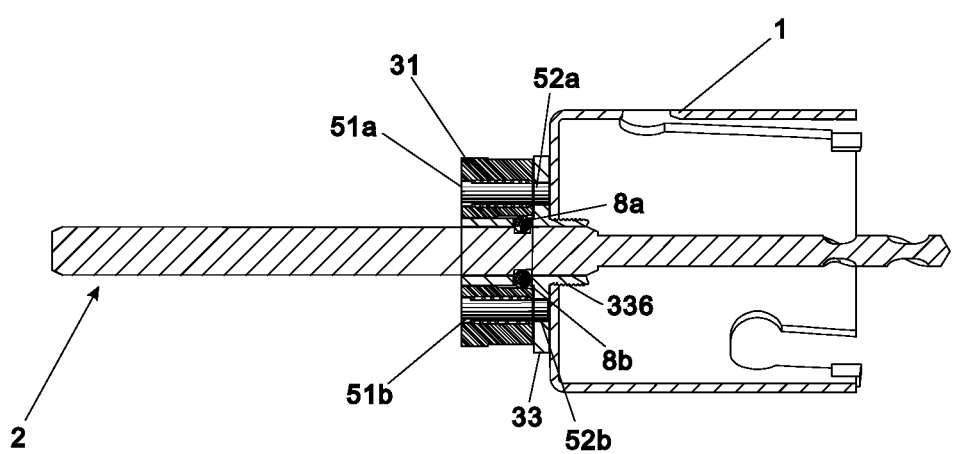
FIG. 9 is a cross-sectional view of the quick-change attachment means and the longitudinal body in a quick-change mode according to the second embodiment of the current invention.
Figure 10:
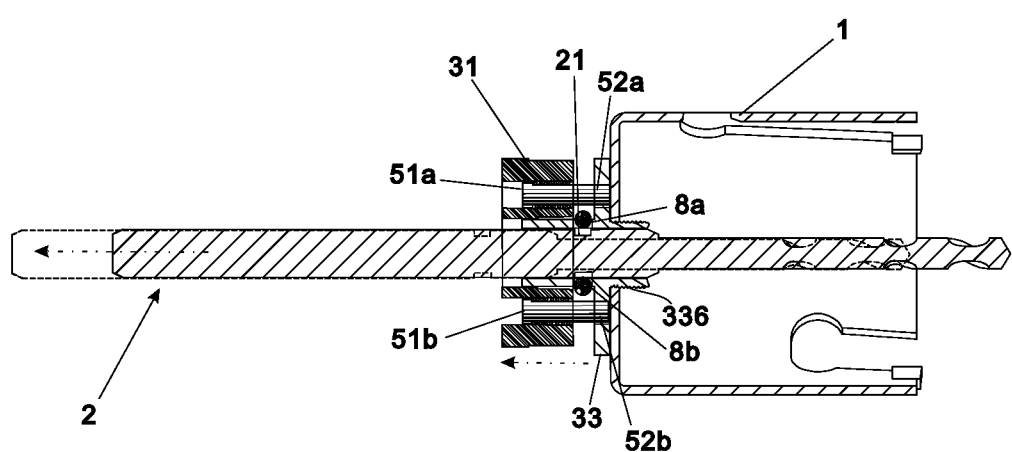
FIG. 10 is a cross-sectional view of the quick-change attachment means and the longitudinal body in a locked mode according to the second embodiment of the current invention.

The mode of operation for the locking and quick-change mechanism with the longitudinal body and quick-change attachment means 3 in the second embodiment of the present invention will be discussed below. The longitudinal body 2 can move radially in the axial hole 335 of the first component 33 of the quick-change attachment means 3. The component for locking the longitudinal body 2 are the retaining balls 8a, 8b disposed in the locking apertures 333a, 333b of the first component 33, which, by way of the backward-moving radial displacement of the positioning component 31 as shown in FIGS. 9 and 10, the longitudinal body 2 is inserted through the axial hole 335 and extends until the limiting portion reaches the locking apertures 333a, 333b. At this point the positioning component 31 is released to let the actuating pins 5a, 5b to be housed by springs 61a, 61b in order to return the positioning component 31 back to its original position. In the meantime the curvilinear portion 344 is used to push against the retaining balls 8a, 8b. The locking apertures 333a, 333b are pressed downward into the limiting portion 21 of the longitudinal body 2, and, by the account of the forward-pushing force applied by the springs 61a, 61b on the actuating pins 5a, 5b, the positioning component 31 is closely held together with the first component 33, thereby causing the curvilinear portion 344 of the positioning component 31 to be closely held against the retaining balls 8a, 8b. At this point about half of the area of the retaining balls 8a, 8b are closely held against the limiting portion 21, so this means the longitudinal body 2 is securely fixed in the quick-change attachment means 3. The mode of operation for detaching the longitudinal body 2 from the quick-change attachment means 3 will now be described below. The positioning component 31 is pulled backward in order to detach the downwardly embedded retaining balls 8a, 8b in the limiting portion 21 of the longitudinal body 2. The retaining balls, in this configuration however, are pushed out by the outer axial handle surface of the limiting portion 21 of the longitudinal body 2 and move upward to return to the locking apertures 333a, 333b. At this point the retaining balls 8a, 8b have some areas that protrude out of the locking apertures 333a, 333b, causing the retaining balls 8a, 8b to exit the limiting portion 21 and therefore the quick-change attachment means 3.

The actuating pins 5a, 5b are used for returning the displaced positioning component 31. Because after the actuating pins 5a, 5b are housed by springs 61a, 61b, the enlarged portions 51a, 51b are set to limit particular ends of the springs 61a, 61b, thereby preventing the springs 61a, 61b from unsleeving the actuating pins 5a, 5b, inserting the actuating pins 5a, 5b housed with springs 61a, 61b into receiving holes 312a, 312b, and moving the positioning component 31 of the locking component 3' backward in a radial direction. In other words, the actuating pins 5a, 5b can simultaneously contract and return to their original position in the receiving holes 312a, 312b of the positioning component 31 at this point. Because the enlarged portions 51a, 51b of the actuating pins 5a, 5b are stuck inside the second openings 3122a, 3122b of the receiving holes 312a, 312b. Therefore the actuating pins 5a, 5b will not completely detach from the receiving holes 312a, 312b. Further, the actuating pins 5a, 5b and the attachment portion 334 are disposed in parallel with respect to each other in the locking apertures 333a, 333b of the attachment portion 334. As a result the pitch above and below the space between the actuating pins 5a, 5b and the attachment portion 334 is smaller than the width of the outer diameter of the retaining balls 8a, 8b. By way of the above, the actuating pins 5a, 5b can exactly block the retaining balls 8a, 8b. The retaining balls 8a, 8b would not completely detach from the locking apertures 333a, 333b, which means that the retaining balls 8a, 8b can be limited in the locking apertures 333a, 333b.

Figure 11:
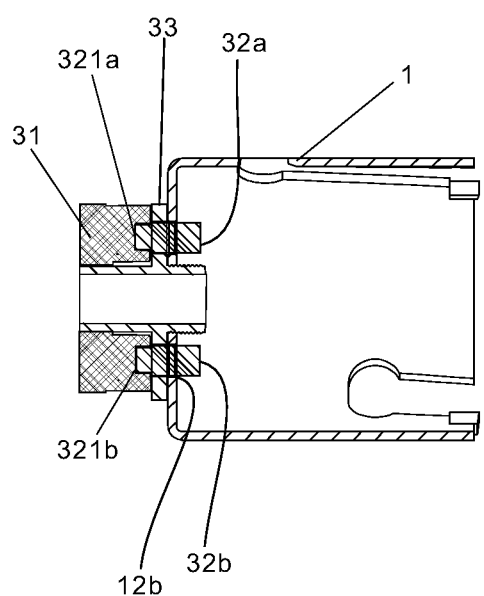
FIG. 11 is a cross-sectional view of the quick-change attachment means and the hole saw in a quick-change mode according to the third embodiment of the current invention.

The positioning and quick-change operation with the quick-change attachment means 3 and the hole saw 1 for the second embodiment of the present invention will now be discussed with reference to FIG. 11. The drawing therein shows a positioned status for the quick-change attachment means 3 and the hole saw 1. Firstly shown is the quick-change attachment means 3 and the hole saw 1 set up in an assembled status. The positioning component 31 of the quick-change attachment means 3 is pulled back to be temporarily retained in a given position, causing the pins 32a, 32b to be permitted to simultaneously move backward. Next, the threaded portion 336 is threadably attached to the threaded aperture 111 on the hole saw 1, until the pins 32a, 32b of the quick-change attachment means 3 are aligned with the coupling apertures 12a, 12b, 12c, 12d of the closed end 11 of the hole saw 1. After two corresponding apertures are aligned with, the positioning component 31 is released to return to its original position, and the mutually corresponding pins 32a, 32b are set to return to their original position. By way of returning the pins 32a, 32b back to their original positions to protrude through the mutually corresponding two apertures of the coupling apertures 12a, 12b, 12c, 12d of the hole saw 1, the quick-change attachment means 3 uses the pins 32a, 32b to pass through the coupling apertures 12a, 12b, 12c, 12d of the hole saw 1, such arrangement can stabilize positioning and prevent unscrewing as a result of driving rotation.

Figure 12:
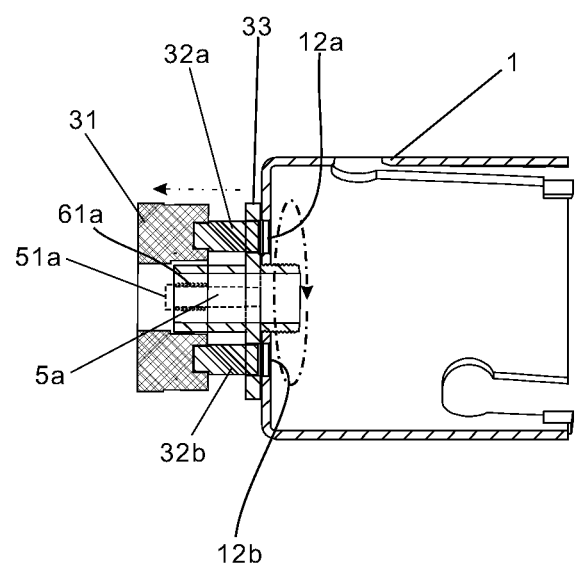
FIG. 12 is a fourth view of the quick-change attachment means and the hole saw in a locked mode according to the fourth embodiment of the current invention.

The quick-change operation with the quick-change attachment means 3 and the hole saw 1 is now described. The first step begins with pulling the positioning component 31 of the quick-change attachment means 3 backward and holding the it down by hand to temporarily stabilize the position. At the same time, the pins 32a, 32b are pulled backward. After the pins 32a, 32b detach from the mutually corresponding tow apertures of the coupling apertures 12a, 12b, 12c, 12d, the threaded portion 336 is unscrewed by way of rotation to come off from the threaded aperture 111 of the hole saw. Then the held-down positioning component 31 is released to return to their original position, at the same time, the corresponding pins 32a, 32b are relieved to their original position. The quick-change attachment means 3 is detached from the hole saw 1, as shown in FIG. 12 which shows the quick-change operation with the quick-change attachment means 3 and the hole saw 1.

By way of the above, the cross-sectional area and the corresponding outer shape of the quick-change attachment means 3 can be circular, elliptical or polygonal (examples include hexagonal or quadrilateral).

The longitudinal body 2 that may be used to assemble with the quick-change attachment means 3 can be a drill bit shank, and other tools. Examples include razors, hole saws, diamonds, polishing discs, or polishing films, brushes, tools for boring a hole, tools for grinding, or other similar tools. Such design can help create a multi-purpose tool replacement system.

The above is only for the description of the preferred embodiments of the utility model, not for limiting the scope of this utility model. Any modifications, equivalent changes and improvements that are within the spirit and principles in the utility model should be included in the scope of protection of the utility model.

What is claimed is:

1. A tool, comprising:
   a hole saw having a threaded aperture, a closed end, and coupling apertures;
   a longitudinal body having a driving end, a tool end, and a limiting portion between said driving end and said tool end; and a quick-change attachment means which comprises:
a locking component which comprises a first component having first attachment apertures, positioning apertures, an attachment portion, a threaded portion detachably coupled at said threaded aperture of said hole saw, and an axial hole extended through said attachment portion and said threaded portion, wherein said longitudinal body passes through said axial hole of said first component and said threaded aperture of said hole saw, wherein said first attachment apertures and said positioning apertures are located in a radial direction of said axial hole;
a positioning component having a second central hole wherein said attachment portion of said first component passes therethrough, wherein said positioning component is movable in an axial direction of said first component;
two actuating pins extended from said positioning component to engage with said positioning apertures of said first component to guide an axial displacement of said positioning component with respect to said first component;
two locking pins extended from said positioning component through said first attachment apertures to detachably couple with said coupling apertures of said hole saw respectively, wherein when said positioning component is axially moved toward said first component, said pins are driven to move to engage with said coupling apertures of said hole saw respectively, and when said positioning component is axially moved away from said first component, said pins are driven to move to detach from said coupling apertures of said hole saw respectively, so as to allow said hole saw to be detached from said first component.

2. The tool, as recited in claim 1, wherein said locking component further comprises a second component which is free to move forward and backward axially with respect to said first component, wherein said second component has a first central hole that said attachment portion of said first component passes therethrough, first through holes where said actuating pins pass therethrough to said positioning apertures of said first component, and second attachment holes where said locking pins pass therethrough to said first attachment apertures of said first component.

3. The tool, as recited in claim 2, wherein said quick-change attachment means further comprises a biasing member disposed between said positioning component and said second component for preventing said positioning component and said second component moving backward together.

4. The tool, as recited in claim 1, wherein said positioning component further has a first end surface, a second end surface, and receiving holes extended from said first end surface to said second end surface, wherein said actuating pins are extended through said receiving holes respectively, wherein each of said receiving holes has a first opening formed at said first end surface and a second opening formed at said second end surface, wherein an inner diameter of said second opening is smaller than an inner diameter of said first opening.

5. The tool, as recited in claim 3, wherein said positioning component further has a first end surface, a second end surface, and receiving holes extended from said first end surface to said second end surface, wherein said actuating pins are extended through said receiving holes respectively, wherein each of said receiving holes has a first opening formed at said first end surface and a second opening formed at said second end surface, wherein an inner diameter of said second opening is smaller than an inner diameter of said first opening.

6. The tool, as recited in claim 4, wherein said quick-change attachment means further comprises two springs disposed in said receiving holes respectively, wherein each of said actuating pins has an expanding portion at one end and a positioning portion at another end, wherein said actuating pins are extended through said springs and passed through said receiving holes at a position that said expanding portions of said actuating pins are biased against said spring while said positioning portions of said actuating pins are engaged with said positioning apertures of said first component via a tenon and mortise joint.

7. The tool, as recited in claim 5, wherein said quick-change attachment means further comprises two springs disposed in said receiving holes respectively, wherein each of said actuating pins has an expanding portion at one end and a positioning portion at another end, wherein said actuating pins are extended through said springs and passed through said receiving holes at a position that said expanding portions of said actuating pins are biased against said spring while said positioning portions of said actuating pins are engaged with said positioning apertures of said first component via a tenon and mortise joint.

8. The tool, as recited in claim 4, wherein said quick-change attachment means further comprises a plurality of retaining balls, wherein said first component further has a plurality of locking apertures provided at said attachment portion to receive said retaining balls, wherein a portion of each of said retaining balls protruded out of said locking aperture to hold up on said limiting portion of said longitudinal body such that said longitudinal body is securely locked with said quick-change attachment means.

9. The tool, as recited in claim 7, wherein said quick-change attachment means further comprises a plurality of retaining balls, wherein said first component further has a plurality of locking apertures provided at said attachment portion to receive said retaining balls, wherein a portion of each of said retaining balls protruded out of said locking aperture to hold up on said limiting portion of said longitudinal body such that said longitudinal body is securely locked with said quick-change attachment means.

10. The tool, as recited in claim 1, wherein said axial hole is hexagonal.

11. The tool, as recited in claim 2, wherein an outer diameter of said attachment portion is slightly smaller than said first central hole and said second central hole.

12. The tool, as recited in claim 1, wherein said longitudinal body is a drill bit shank.

13. A quick-change attachment configuration for a tool comprising a hole saw having a threaded aperture, a closed end, and coupling apertures, and a longitudinal body having a driving end, a tool end, and a limiting portion, wherein said quick-change attachment configuration comprises:
a locking component which comprises a first component having first attachment apertures, positioning apertures, an attachment portion, a threaded portion detachably coupled at said threaded aperture of said hole saw, and an axial hole extended through said attachment portion and said threaded portion, wherein said axial hole of said first component is arranged for allowing the longitudinal body to pass therethrough to the threaded aperture of the hole saw, wherein said first attachment apertures and said positioning apertures are located in a radial direction of said axial hole;
a positioning component having a second central hole wherein said attachment portion of said first component passes therethrough, wherein said positioning component is movable in an axial direction of said first component;

two actuating pins extended from said positioning component to engage with said positioning apertures of said first component to guide an axial displacement of said positioning component with respect to said first component;

two locking pins extended from said positioning component through said first attachment apertures for detachably coupling with the coupling apertures of the hole saw respectively, wherein when said positioning component is axially moved toward said first component, said pins are driven to move for engaging with the coupling apertures of the hole saw respectively, and when said positioning component is axially moved away from said first component, said pins are driven to move for detaching from the coupling apertures of the hole saw respectively so as to allow the hole saw to be detached from said first component.

14. The quick-change attachment configuration, as recited in claim 13, wherein said locking component further comprises a second component which is free to move forward and backward axially with respect to said first component, wherein said second component has a first central hole that said attachment portion of said first component passes therethrough, first through holes where said actuating pins pass therethrough to said positioning apertures of said first component, and second attachment holes where said locking pins pass therethrough to said first attachment apertures of said first component.

15. The quick-change attachment configuration, as recited in claim 14, further comprising a biasing member disposed between said positioning component and said second component for preventing said positioning component and said second component moving backward together.

16. The quick-change attachment configuration, as recited in claim 13, wherein said positioning component further has a first end surface, a second end surface, and receiving holes extended from said first end surface to said second end surface, wherein said actuating pins are extended through said receiving holes respectively, wherein each of said receiving holes has a first opening formed at said first end surface and a second opening formed at said second end surface, wherein an inner diameter of said second opening is smaller than an inner diameter of said first opening.

17. The quick-change attachment configuration, as recited in claim 13, further comprising two springs disposed in said receiving holes respectively, wherein each of said actuating pins has an expanding portion at one end and a positioning portion at another end, wherein said actuating pins are extended through said springs and passed through said receiving holes at a position that said expanding portions of said actuating pins are biased against said spring while said positioning portions of said actuating pins are engaged with said positioning apertures of said first component via a tenon and mortise joint.

18. The quick-change attachment configuration, as recited in claim 13, further comprising a plurality of retaining balls, wherein said first component further has a plurality of locking apertures provided at said attachment portion to receive said retaining balls, wherein a portion of each of said retaining balls protruded out of said locking aperture for holding up on the limiting portion of the longitudinal body such that the longitudinal body is securely locked with said quick-change attachment configuration.

19. The quick-change attachment configuration, as recited in claim 13, wherein said axial hole is hexagonal.

20. The quick-change attachment configuration, as recited in claim 14, wherein an outer diameter of said attachment portion is slightly smaller than said first central hole and said second central hole.

* * * * *